United States Patent [19]

Gordon

[11] 4,443,387

[45] Apr. 17, 1984

[54] EVAPORATIVE COOLING DEVICE AND PROCESS FOR COOLING LARGE AREAS

[76] Inventor: R. Robert Gordon, 11300 Chimineas Ave., Northridge, Calif. 91326

[21] Appl. No.: 337,165

[22] Filed: Jan. 5, 1982

[51] Int. Cl.³ .............................................. B01F 3/04
[52] U.S. Cl. .................................. 261/30; 261/79 A; 119/16; 119/21; 119/159
[58] Field of Search ............... 261/30, 79 A; 239/399; 55/230; 119/16, 21, 159

[56] References Cited

U.S. PATENT DOCUMENTS

| 942,712 | 12/1909 | Comins | 261/30 |
| 1,266,966 | 5/1918 | McEwen | 261/30 |
| 1,511,450 | 10/1924 | Findlay | 119/158 |
| 1,817,384 | 8/1931 | Lewis et al. | 119/16 |
| 1,858,724 | 5/1932 | Armstrong | 261/30 |
| 2,029,141 | 1/1936 | Warner | 239/399 |
| 2,343,959 | 3/1944 | Cummings, Jr. | 261/30 |
| 2,759,713 | 8/1956 | Maniscalco, Sr. | 261/79 A |
| 3,102,586 | 9/1963 | Diepenbroek | 261/79 A |
| 3,761,065 | 9/1973 | Rich et al. | 261/79 A |
| 4,242,109 | 12/1980 | Edwards | 55/230 |

FOREIGN PATENT DOCUMENTS

| 462744 | 8/1928 | Fed. Rep. of Germany | 261/79 A |
| 580388 | 7/1933 | Fed. Rep. of Germany | 261/30 |
| 1193477 | 5/1965 | Fed. Rep. of Germany | 261/79 A |
| 2652812 | 5/1978 | Fed. Rep. of Germany | 261/79 A |
| 2454060 | 7/1980 | France | 119/16 |
| 97581 | 1/1923 | Switzerland | 261/30 |

Primary Examiner—Tim R. Miles
Attorney, Agent, or Firm—K. H. Boswell; Edward D. O'Brian

[57] ABSTRACT

A device for evaporative cooling of large masses of air suitable for cooling structures utilized to shelter commercial animals, such as cows and the like, includes a member having a gas inlet, a gas outlet and a hollow interior extending between the inlet and outlet. A fan and motor are associated with the inlet for moving air into the inlet creating an air stream within the interior of the member. A plurality of vanes are located within the interior of the member for introducing a torsional component into the air stream passing through the member such that the air stream moves through the member in a spiral pathway. As the air stream spirals through the member, a spray of water is introduced into the member. The spray becomes incorporated into the spirally moving air stream to reduce the temperature of the air stream. After exiting out of the outlet of the member, the air stream is directed toward the animals of commercial interest to cool both the animals and their immediate surroundings. The device is extremely effective in modifying the environment of dairy cows and the like in climates having elevated temperatures.

26 Claims, 6 Drawing Figures

EVAPORATIVE COOLING DEVICE AND PROCESS FOR COOLING LARGE AREAS

BACKGROUND OF THE INVENTION

This invention is directed to a device for evaporative cooling of a large mass of air such that the large mass of air can be utilized to cool partially open enclosures utilized in such industries as the dairy industry and the like. The invention utilizes an apparatus which moves an air stream through a spiral pathway and induces a water spray into the air stream as it moves in the spiral pathway.

In certain industries wherein large structures are utilized and where these structures by the very nature of the industry cannot be sealed to air egress and ingress, it has been found extremely difficult to modify the environment within the interior of this structure by reducing the air temperature therein. Because of the high cost associated with their use, refrigerated air conditioning units are precluded. Further, evaporative coolers based upon passing an air stream through a wetted pad and the like have found little utility in cooling these structures because of problems related to them as outlined below.

The dairy industry, as it has practiced in the southwestern portion of the United States and in other areas having similar climatic conditions, must provide for shelters and the like for the animals against the extreme temperatures occurring during midday during the summer season. Typical daily average temperatures equal or exceed 100° F. The dairy animals, if left exposed to the midday and afternoon sun at these temperatures, would die from exposure. To combat this, the use of corrals shades is wide spread. These corrals shades are essentially open sided structures having a roof. The roof provides a shaded area which moves as the sun traces its pathway overhead. Normally, these corrals are constructed as elongated structures with elongated axis oriented north and south. This construction is utilized in order to allow the ground area underneath the roof of the corral to be exposed at some time during the day to the sun's rays to dry out the moisture accumulating there from the waste products of the animals.

The corrals are constructed without walls for several reasons. The first of these being economics. The second being allowing for convenient removal of the waste products of the animals on a periodic basis from beneath the corral roof. The lack of walls on the corral also allows for air flow across the ground beneath the roof to further augment the drying out of the moisture accumulated there as a waste product from the cows. If these waste products were allowed to build up in a moisturized state, because of the high temperature, pathogen growth in the waste products would be excess and detrimental to the health of the animals.

Even though the animals are provided with the corral structure to provide a shady environment at all times during the day, their efficiency in producing milk is compromised because of high temperatures. The compromise in the animals efficiency in turn compromises the economics of the dairy operation.

The only presently known air conditioning system for use with the above noted corral structures are the devices commonly known as "swamp coolers." In these devices a porous pad, e.g. excelsior or the like, is wetted by a water spray or by drip nozzles. The air is forced through the wetted pads reducing the air temperature as a result of evaporation of the water picked up by the air as it moves through the pads. This system suffers several defects when utilized with the open corral structures normally found in conjunction with the dairy industry.

Because the air in passing through the above noted swamp cooler must be forced through a restricted opening, i.e. the wetted pad, a blower must be driven by an electrical motor of a sufficient capacity to drive the air through this restriction. Presently, this requires the use of an approximate ¾ h.p. motor located every 10 feet along the length of the corral structure. Further, since the pads are in a continually damp or wetted state, they are subject to deterioration by both mechanical abuse and by the growth of mold and the like on the continually wetted pads. This requires frequent replacement of the pads which further detracts from the economics of the use of this type of system.

As alluded to above, it has generally been found necessary to locate a swamp cooler, at intervals approximately every ten feet, along the length of the corral structure. It can easily be seen that with a dairy herd of even moderate size, an appreciable number of units must be installed in order to provide for cooling of the appropriate square footage of the corral structure necessary to shade the herd.

In view of the above, it is evident that there exists a need for new and improved methods of cooling large areas. Further, because in certain industries, such as the dairy industry wherein the cooling must be done in areas having open walled structures, the economics of any cooling system can be very critical because of the continued loss of the cooled air out of the open structure. It is further evident that there exists a need for methods and apparatus of cooling these types of structures which do not rely on air flow through wetted pads because of the increase in horsepower needed to force air through the wetted pads and because of the short lifetime of the wetted pads brought about by their continued exposure to moisture.

BRIEF DESCRIPTION OF THE INVENTION

In view of the above, it is a broad object of this invention to provide an apparatus and a process for cooling of large masses of air in open wall structures. It is a further object of this invention to provide for an apparatus and a process which is capable of producing a large volume and/or mass of cool air in an economical manner thus contributing to the economics of the industry which it serves. Additionally, it is an object of this invention to provide for an apparatus which because of its engineering and construction requires little or no maintenance and can be turned off and on a,t will. It is also an object of this invention to provide an apparatus which because of its construction is not subject to operational problems brought about by the deposit of scale, corrosion and the like from water flowing through the apparatus.

These and other objects as will become evident from the remainder of this specification are achieved in a device for evaporative cooling of a mass of air which comprises: a member having at least one gas inlet, a gas outlet and a hollow interior extending between said gas inlet and said gas outlet; a first means associated with said member, said first means capable of moving air in an air stream from said gas inlet through the interior of said member and discharging said air stream out of said gas outlet, said first means moving said air stream through the interior of said member in a spiral pathway; a second means associated with said member and capable of introducing a quantity of water into said air stream as it moves in said spiral pathway through the interior of said member such that at least a portion of said quantity of water will evaporate within said air stream reducing the temperature of said air stream.

The second means would include a nozzle means located in the interior of the member and capable of introducing the quantity of water as a water spray in the air stream as it moved in the spiral pathway within the interior of the member. The first means would include an air moving means associated with the air inlet of the member. The air moving means would move the air stream through the air inlet and through the interior of the member in said spiral pathway with a force sufficient to discharge the air stream out of the air outlet of the member.

The first means would further include a plurality of air streamed direction modifying means which are capable of introducing a torsional component into the movement of the air stream as the air stream moves between the air inlets and outlet. The torsional component in combination with a longitudinal component imparted to the air stream by the air moving means would cause said air stream to move in said spiral pathway throughout the interior of the member.

In the preferred embodiment of the invention, the air stream directional means would comprise a plurality of vanes located in an array within the interior of the member. Further, the air moving means would comprise a fan rotatably mounted on the member and a means associated with the fan to rotate the same.

In the preferred embodiment of the invention, the member would include a first chamber which is cylindrical along at least a portion of its length and having at least a portion of the plurality of said vanes located on the inside of the first chamber. The nozzle means would also be located within the interior of said first chamber and said first chamber would have a first end and a second end. The second end would comprise the gas outlet of the device and said first end would be oriented toward said fan.

In addition to the above noted components, the preferred embodiment of the invention also includes a venturi component located in association with the first end of said first chamber. The fan would be rotatably mounted within an opening in said venturi component such that air contacted by the fan moves in an air stream through said opening in said venturi component and into said first chamber. The opening in the venturi component would be sized such that its diameter would be less than the inside dimension of said first chamber and at least a first open annulus would exist between the outside of the venturi component and the inside of the first chamber. The first open annulus would comprise a second gas inlet into said member. The air stream exiting through said opening in said venturi component would create a reduced pressure at said second air inlet such that air from the ambient environment would be drawn into said reduced pressure area and into said air stream flowing in said spiral pathway within the interior of said member.

Further, the member could include a second chamber. The second chamber would be cylindrical in shape and have open first and second ends. The outside diameter of the second chamber would be less than the inside diameter of the first chamber such that the first and second chambers could be mounted concentrically with each other with the second chamber being located at the first end of the first chamber. The differences in the diameter of the concentric first and second chambers would form a second open annulus comprising a third inlet to the interior of said member. The venturi component would be located in association with the first end of the second chamber such that the first annulus and the second air inlet are positioned between the venturi component and the second chamber.

Preferredly, the member is vertically oriented such that the longitudinal axis of the first and second chambers and the venturi component are also vertically oriented with this longitudinal axis passing through the center of rotation of the center of the fan. Preferredly, at least a portion of said plurality of vanes would be located in said first chamber and a portion of said vanes would be located in said second chamber. The vanes in the second chamber would be located at an elevated position with respect to said vanes in the first chamber. Additionally, the vanes in said first chamber would be located in tiers, one above the other, along the inside surface of the first chamber. The fan would be chosen to include a plurality of fan blades-each of which would be oriented at an angle with respect to said longitudinal axis passing through the center of rotation of said fan. The vanes located in the second chamber would be oriented with respect to said longitudinal axis at a greater angle than the angle of said fan blades and the uppermost tier of the vanes located in the first chamber would be oriented with respect to said longitudinal axis at a greater angle than the angle of said vanes located in said second chamber. Further, each of the remaining plurality of tiers of said vanes in said first chamber would be oriented with respect to the longitudinal axis at a greater angle than the tier of vanes located immediately above it. Thus, as the air stream descends through the member through first the venturi component followed by the second chamber and then the first chamber, the air stream contacts vanes each having a greater angle with respect to said longitudinal axis as the air stream moves downward through the member. As the air stream contacts vanes having increasingly greater angles an increasingly greater torsional component is imparted to the air stream contributing to the spiral pathway of the air stream through the member.

BRIEF DESCRIPTION OF THE DRAWINGS

This invention will be better understood when taken in conjunction with the drawings wherein.

The evaporative cooling device shown in the drawings and described in this specification utilizes certain principles and/or concepts as are set forth in the claims appended to this specification. Those skilled in the cooling arts will realize that these principles and/or concepts could be utilized in a number of devices differing from the illustrative device disclosed in this specification. For this reason, this invention is not to be construed as being limited to the exact illustrative embodiment described herein, but is to be construed only in light of the claims.

DETAILED DESCRIPTION OF THE INVENTION

To facilitate understanding of this invention, the actual physical apparatus of the invention will first be described in straight mechanical terms followed by a description of interaction of the different components of the apparatus.

Figure 1:
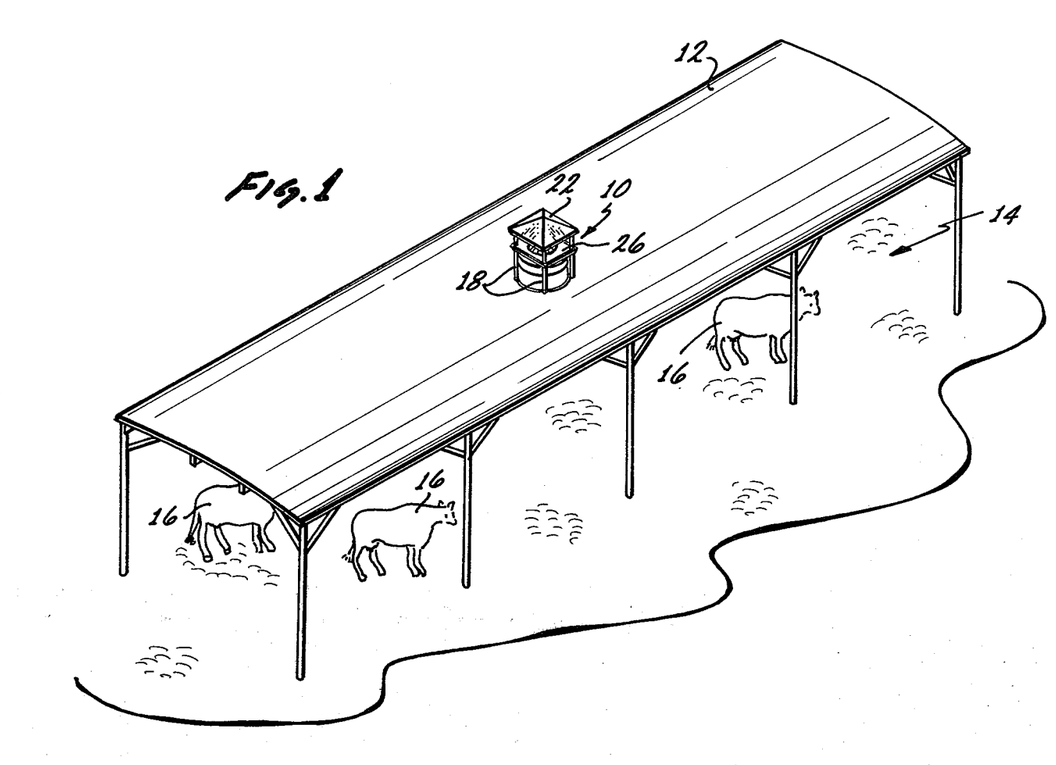
FIG. 1 shows a corral structure with the evaporative cooling device of this invention located on the roof of the corral structure with a portion projecting upwardly from said roof and the remaining portion hidden from view below said roof.

Referring to FIG. 1, the apparatus 10 of this invention is shown located on the roof 12 of a corral 14. Only a portion of the apparatus 10 is exposed above the roof 12 of the corral 14. The roof 12 of the corral 14 is of a typical construction normally used in the dairy industries and, as can be seen, is of a height significantly higher than the cows collectively identified by the numeral 16 in the FIGS.

Figure 2:
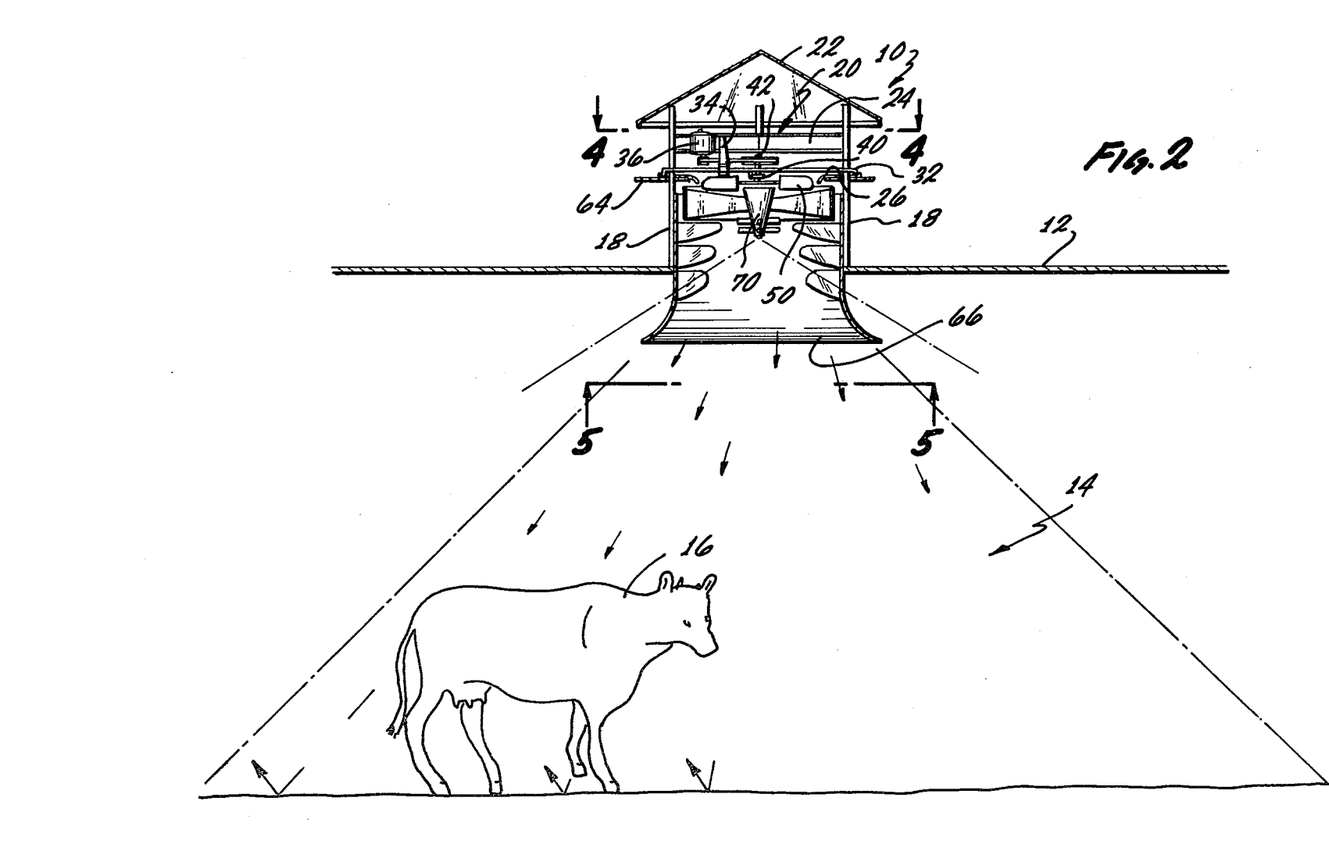
FIG. 2 shows a side elevational view of the device of FIG. 1 in partial section and further illustrates the distribution pattern of cool air discharged from the device of the invention.
Figure 3:
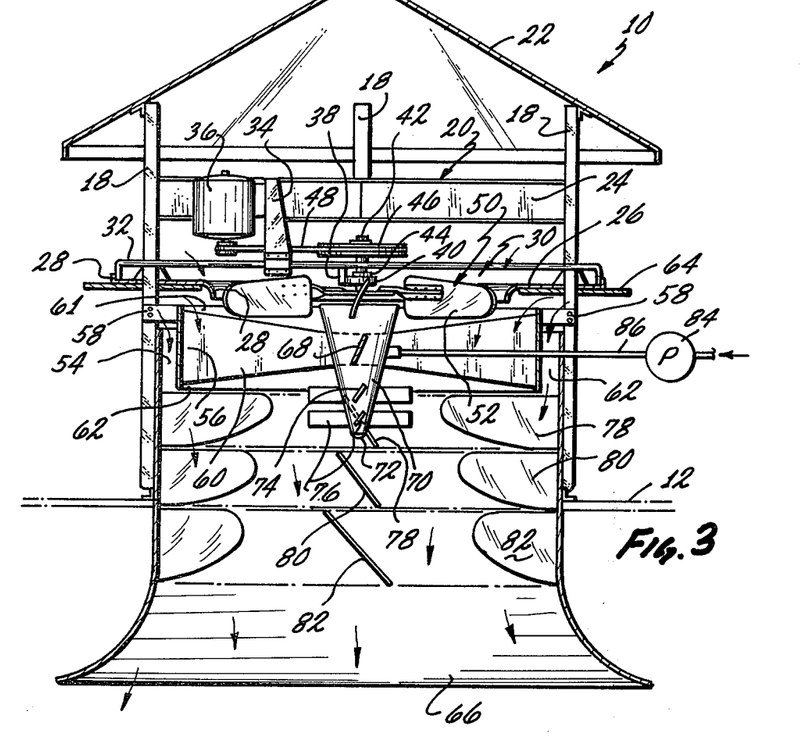
FIG. 3 is a side elevational view in partial section showing in greater detail the device as shown in FIG. 2.
Figure 4:
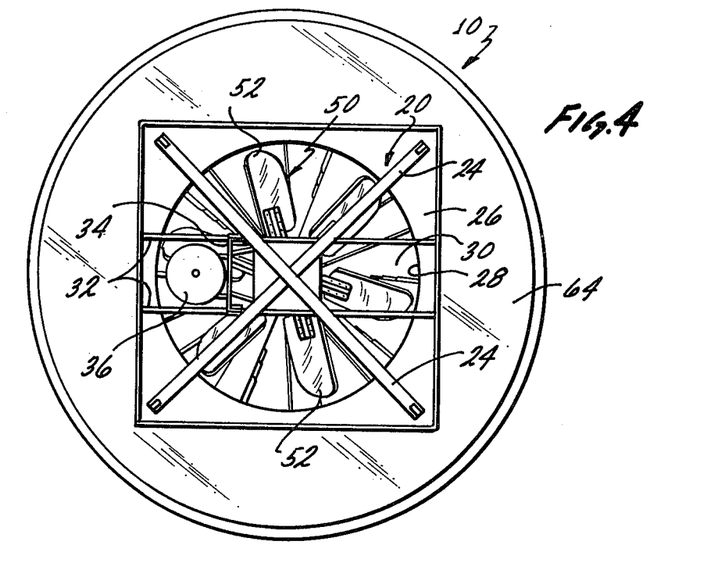
FIG. 4 is a top plan view of the totality of the device in about the lines 4—4 of FIG. 2.
Figure 4A:
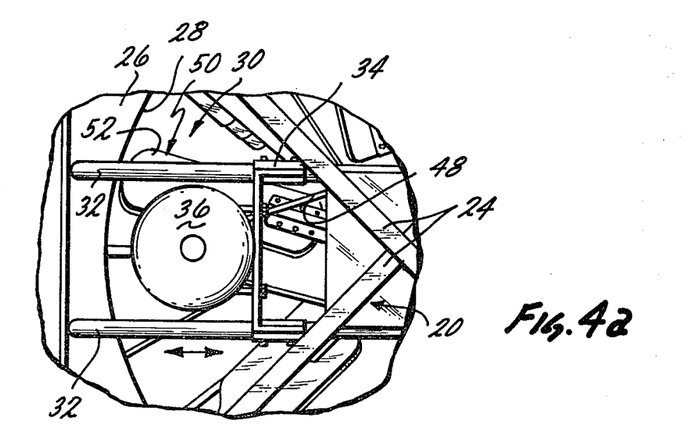
FIG. 4a is a top plan view taken about the lines 4—4 of FIG. 2 showing a portion of the device of the Figure.

Referring now to FIGS. 2 and 3, the device 10 includes appropriate vertical support brackets collectively identified by the numeral 18 which are attached to appropriate horizontal support brackets collectively identified by the numeral 20. Both of these sets of brackets are preferredly made of a structural metal suitable for attaching to each other by appropriate techniques, such as welding, riveting and the like. The horizontal support brackets 20 mount onto the roof 12 and support the remainder of the apparatus 10 in an appropriate opening (not identified or numbered) in the roof 12 of corral 14. A protective canopy 22 is attached to the vertical support brackets 18 and serves as a shield for the components located beneath it. The area immediately beneath the canopy 22 is open allowing free ingress of ambient air beneath the canopy 22 and into the apparatus 10.

An x-shaped structural member 24 composed of individual 1 beam components (not separately identified or numbered which are attached together) extend between the vertical support brackets 18 near their upper periphery directly below the canopy 22. The structural member 24 lends structural strength to the apparatus 10.

Located below the structural member 24 is a plate 26 having a downwardly and inwardly directed lip 28. The lip 28 defines an opening 30. Because of the shape of the lip 28, the lip 28 forms a venturi tube in the plate 26.

Two parallel support bars collectively identified by the numeral 32 are bent downwardly on their respective ends which in turn are attached to the plate 26 such that the bars 32 are displaced slightly upwardly from the plate 26. A motor mount 34 is slidably mounted on the bars 32. Attached to the motor mount 34 is an electric motor 36. A cross bar 38 extends between the bars 32. A bearing 40 is attached to the cross bar 38. A shaft 42 passes vertically through the bearing 40. Fixed on the shaft 42 above the bearing 40 is a bushing 44 which prevents the shaft 42 from slipping downwardly in the bearing 40. A pulley 46 is mounted above the bushing 44 and a belt 48 extends around the pulley 46 and around an appropriate pulley (not identified or numbered) mounted on the motor 36. The motor 36 via the belt 48 rotates the shaft 42 in the bearing 40.

Attached to the end of shaft 42 below the bearing 40 is a fan 50. The fan 50 includes a plurality of fan vanes collectively identified by the numeral 52. The fan vanes 52 are located in the throat or opening 30 of the venturi tube formed by the lip 28 on the plate 26.

Moving upwardly from the bottom of the apparatus 10 toward the canopy 22 is a first duct or chamber 54 followed by a second duct or chamber 56. Both of these chambers 54 and 56 are concentric with the opening 30 in the venturi plate 26 and the fan 50. The bottom of the first chamber 54 is appropriately flared as is best seen in FIG. 3 to help with air distribution and to prevent hot air laying against the bottom side of the roof 12 from being incorporated into the air stream exiting the apparatus 10 as hereinafter explained. The first chamber 54 is appropriately attached to the horizontal support brackets 18 by direct attachment of its outside surface to the brackets 18. The second chamber 56 is attached to the brackets 18 via four horizontally extending brackets collectively identified by the numeral 58 extending between it and the vertical support brackets 18. Preferredly, both the chambers 54 and 56 are formed of sheet metal such that they can be conveniently shaped into the appropriate shape yet are lightweight.

The diameter of the second chamber 56 is slightly smaller than the diameter of the first chamber 54; however, the diameter of the second chamber 56 is greater than the diameter of the opening 30 in the venturi plate 26. The second chamber 56 is located such that its top edge is located slightly below the lowermost periphery of the lip 28. The fan vanes 52, as noted above, are partially positioned within the opening 30 of the venturi plate 26 and, as can be seen in FIG. 3, an additional portion of them extends downwardly within the upper periphery of the second chamber 56.

The second chamber 56 is a hollow cylinder having a top opening 61 and a bottom opening 60. Since the diameter of the second chamber 56 is smaller than the diameter of the first chamber 54 and since the second chamber 56 extends into the uppermost periphery of the first chamber 54, as seen in FIG. 3, an opening 62 is formed between the first chamber 54 and the second chamber 56. The opening 62 is formed as an annulus between the inside wall of the first chamber 54 and the outside wall of the second chamber 56. The opening 61, could also be construed as being an annulus. This annulus would be defined by the inside wall of the second chamber 56 and the tip of the fan vanes 52 when they are rotating under the influence of the motor 36 in combination with the bottom edge of the lip 28 extending from the venturi plate 26. In any event, both the openings 61 and 62 provide for air flow into the respective second chamber 56 and the first chamber 54. The function of these openings will be outlined below.

A plate 64 extends below the venturi plate 26 beyond its periphery outwardly from the vertical support brackets 18. This plate 64 serves to isolate the opening 61 from the effects of air movement across the top of the plate 26 into the opening 30 under the influence of rotation of the fan 50. Air drawn into both of the openings 61 and 62 moves along the bottom of the plate 64 into these respective openings.

The bottom opening 60 in the second chamber 56 is essentially a circular opening, as is the bottom opening 66 in the first chamber 54. The bottom opening 66 serves as the air outlet for the apparatus 10.

Figure 5:
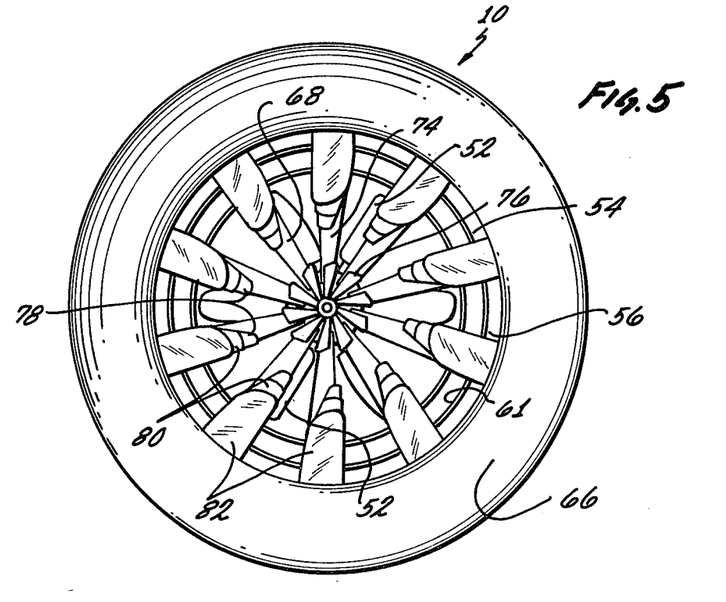
FIG. 5 is a bottom plan view of the device taken about the line 5—5 of FIG. 2.

A set of vanes collectively identified by the numeral 68 extend from the inside wall of the second chamber 56 toward the center of this chamber. In the illustrative embodiment, there are ten of these vanes 60 as is best seen in FIG. 5. These vanes are set at an angle to the longitudinal axis of the chamber as will be discussed below. On their inner ends toward the center of the apparatus 10, the vanes 68 meet with and support an inverted cone 70. The cone 70 serves as a support for a nozzle 72 located at the apex of the cone 70 as well as a support for two tiers of vanes collectively identified by numerals 74 and 76. Further, the cone 70 serves to smooth out turbulent air flow from air moving downwardly through the apparatus 10 under the influence of the fan 50.

Three tiers of vanes collectively identified by their numerals 78, 80 and 82 are located on the inside surface of the first chamber 54. Preferredly, the number of these vanes in each of the tiers as well as the number of the vanes collectively identified by the numerals 74 and 76 are the same as the number of the vanes 68, ten in number in the illustrative embodiment. The vanes 78, 80 and 82 extend toward the center of the apparatus 10; however, as one progresses toward the outlet opening 66, the extension of the vanes toward the center decreases. It can be considered that a longitudinal axis for the apparatus 10 passes through the shaft 42 downwardly concentric with the opening 30 in the venturi plate 26, the center of the fan 50, the center of the cone 70, the center of the second chamber 56 and the center of the first chamber 54.

Progressing downwardly toward the opening 66 from the fan 50 each of the set of vanes 68, 74, 76, 78, 80 and 82 are set at a greater angle to the longitudinal axis of the apparatus 10 than is the set of vanes immediately above it. This is evident from viewing the vanes seen edgewise in the center of FIG. 3. The presence of the set of vanes 74 and 76 on the cones 70 serves to help move the air flow through the apparatus 10 as hereinafter described.

Water under pressure via the pump 84 is conducted by the line 86 into the cone 70 and through the interior of the cone to the nozzle 72. Water is discharged through the nozzle 72 under the pressure developed by the pump 84 into the interior space of the apparatus 10. The pump 84 is, of course, appropriately pumped by a suitable motor or the like (not shown or numbered).

As seen in FIG. 2 in a static situation when no air is flowing downwardly through the apparatus 10, the spray pattern (the uppermost phantom lines) of water exiting the nozzle 72 is conical in shape and would in fact strike the lower set of vanes 82 in the first chamber 54 as well as the walls of this chamber near the air outlet 66. However, when air is moving down through the apparatus 10 under the influence of the fan 50 the pattern of the air stream (the lowermost phantom lines) developed is such that the conical spray pattern of the water ejected from the nozzle 72 is such that the angle of the water spray cone measured at the nozzle 72 is reduced compared to the above noted static condition and the water spray does not strike the vanes 82 nor the sides of the walls of the first chamber 54. This prevents accumulation of water on the vanes 82 and the walls of the first chamber 54 inhibiting large drop formation as well as inhibiting pathogen growth and corrosion on these surfaces.

Preferredly, all of the vanes 68, 74, 76, 78, 80 and 82 as well as the cone 70 are formed out of galvanized sheet metal such that they can be easily cut and shaped and conveniently attached to their respective supporting surfaces and will not rust. This also provides suitable vanes of lightweight materials which do not contribute appreciably to the weight of the apparatus 10.

The bottom protion of the first chamber 54, as noted above, flares out and extends below the roof line 12. This prevents hot air which rises and becomes lodged against the underside of the roof 12 from being incorporated into the air stream ejected from the apparatus 10. This contributes to the efficiency of the device by preventing this hot air from diluting the cool air which the apparatus 10 ejects downwardly in the pattern shown by the lowermost phantom lines in FIG. 2.

When the apparatus 10 is in operation, the motor 36 causes the fan 50 to spin. The fan 50 is chosen such that it has a high efficiency of air delivery when there is little resistance to air flow. The fan draws air in through the opening 30 of the venturi plate 26 and creates an air stream which initially moves downwardly through the apparatus 10. It is found to maximize the efficiency of the fan, the angle of the fan blades 52 near their tips is chosen to be approximately 23° with respect to longitudinal axis of the apparatus. Each of the sets of tiers of vanes 68, 78, 80 and 82 are set at slightly increasing angles to this longitudinal axis from the set or tier immediately above it. Preferredly, a particular set of vanes would have an angle no greater than 10° greater than the angle of the set of vanes immediately above it. Optimally, this angle would increase only from about 5° to 7°. In any event, the vanes 68 are set at a slightly greater angle than the fan vanes 52 and the vanes 78 are set at even a larger angle than the vanes 68 and so on and so forth for the vanes 80 and 82. In the illustrative embodiment of the invention, the last set of tier of vanes, vanes 82, will be at about 45°. The vanes 74 and 76 are set at approximately the same angle as are the vanes 68. They serve to smooth out air flow near the center of the apparatus 10.

Under the influence of rotation of the fan 50 air is moved through the opening 30 in the venturi plate 26 and given a downwardly or axially directed component of motion as well as an outwardly directed motion off of the fan vanes 52. When this air encounters and strikes the vane 68 it is deflected slightly toward the horizontal introducing a slight torsional component into the air stream. As this air stream moves down and encounters the vane 78 an increased torsional component is introduced into the air stream by the increased angle of the vane 78. Further, as the air stream then progressively encounters the set of vanes 80 and 82 further increases in the torsional component of motion are introduced into the air stream such that as a result of this the air stream moves in a spiral pattern through the interior of the apparatus 10. A vortex affect is created within the center of the apparatus 10 beneath the cone 70. Because of the angle of attack, the sets or tiers of vanes 68, 78, 80 and 82 to the air stream increase in a progressive manner as the air stream moves downwardly in its spiraling pattern, there is a progressive increase in the torsional component of the air stream's movement. Because of this progressive increase, there is little or no stalling of the air stream and minimal energy is lost in introducing the torsional component of movement to the air stream as it moves downwardly toward the outlet 66.

By sizing the apparatus 10 such that the diameter of the first chamber 54 is approximately five feet, after a ten foot drop from the bottom edge of the apparatus 10 the air stream ejected out of the outlet 66 will essentially be sized such that it produces a circular air pattern of approximately twenty-five feet in diameter.

Because the air stream is caused to move in a spiral pattern throughout the length of its travel downwardly through the apparatus 10, it has to travel a longer pathway in traveling through the apparatus 10 compared to if it was ejected straight downwardly. Thus, the air stream is maintained within the apparatus 10 for a long period of time.

By maintaining the air stream within the apparatus 10 for a longer period of time, a longer period of time for evaporation into this air of water from the water spray is achieved. Because of the location of the fan 50 within the opening 30 in the venturi plate 26 a reduced pressure area is created at the opening 58 and air flows into the opening 58 as defined by Bernoullis Principle. Additionally, movement of air down the second chamber 56 and expanding into the first chamber 54 causes introduction of air through the opening 62 into the first chamber 54. The air introduced through both openings 58 and 62 is entrained within the spirally moving air stream moving throughout the interior of the apparatus 10 and becomes a part of the spirally moving air stream at its respective points of entrance.

By utilizing a one-half horsepower motor as the motor 56 and having a first chamber 54 of a five foot diameter, the fan 50 can move approximately thirteen hundred cubic feet of air per minute. The contribution of the openings 58 and 60 increase the air exiting out of the outlet 66 to approximately seventeen hundred cubic feed of air per minute. This results in air being exchanged approximately four times a minute in the twenty-five foot radius pattern described above. The efficiency of the apparatus 10 is thus greatly increased over that of the prior art wherein a three horsepower motor is necessary in each of a bank of apparatuses which are spaced approximately ten feet apart from each other. It can be seen that the electrical requirement for utilizing the apparatus 10 is extremely depressed compared to the prior art devices. Additionally, the prior art devices tended to blast a stream of air at a centralized location such that only a single or a limited number of cows obtained the benefit of the air ejected from such a device. Contrary to this, the present apparatus 10 spreads cooled air in a wide circular pattern allowing for cooling of a significantly larger number of animals.

It is known that a droplet size of approximately 0.002 inches will become entrained in a moving air stream and will not drop under the influence of gravity out of that air stream. Particle sizes larger than the 0.002 inches will tend to drop under the influence of gravity. The nozzle 72 is chosen such that it will eject a spray of water droplets having a size of approximately 0.004 inches. This size is, of course, greater than the 0.002 inches noted above and this droplet, if left simply to drop under the influence of gravity, would strike the ground. This size of droplet is generated by passing water from the pump 84 at a pressure of about 700 pounds per square inch through the nozzle 72. The nozzle 72 is a standard spray nozzle rated to dispense a particular size as outlined above under the appropriate pressure as outlined above. At this pressure and with this standard type nozzle, a flow rate of approximately a half a gallon of water per minute is utilized.

When the water is ejected under the above noted pressure from the nozzle 72, after it travels approximately one eighth of an inch, it literally explodes under the influence of that pressure into droplets of approximately 0.004 inches. This action does several things. First of all it produces the droplets of the appropriate size as well as provides a self-cleaning action which blasts deposits which have accumulated off of the tip of the nozzle 72 because of sediment and the like which might be present in the water introduced into the nozzle 72.

The spray of water ejected from the nozzle 72 encounters the spirally moving air stream descending through the apparatus 10. The individual droplets from this spray become entrained in this air stream. Because the air stream by virtue of its spiral motion is maintained within the apparatus 10 for a longer period of time as discussed above and has an increased path length within the apparatus 10, the time of contact between the water droplets and the air stream is greatly increased. This allows for increased or extended evaporation time of the droplets into the air stream. By maintaining the droplets in contact with the air stream for a longer period of time within the apparatus 10 a greater percentage of the mass of the individual droplets evaporates into the air stream. This has two main effects. The first of these being to evaporate more of the droplets and thus produce a greater cooling of the air stream and the second being to reduce the droplets size below the 0.002 inch level noted above such that by the time the droplets have moved approximately ten feet below the outlet 66 of the apparatus 10 the droplets size is such that they overcome the influence of gravity and are maintained entrained into the air stream. When the air stream exiting the outlet 66 of the apparatus 10 encounters the ground, any droplets remaining in this air stream are below the critical 0.002 inch size and they bounce with the air stream off the ground and are directed upwardly and eventually evaporate.

By having the droplets' size reduced below the critical 0.002 inch level, if and when the droplets encounter the ground, it is ensured that these droplets will not wet the ground. As noted previously, it is important to ensure drying of the ground below the corral 14 in order to inhibit pathogen growth.

Because of the features outlined above for the apparatus 10, the water droplets ejected from the nozzle 72 are maintained within the air mass for a longer period of time allowing for more complete evaporation and thus for more efficient cooling of the air stream moving through the apparatus 10. Further, because of the method of injection of the water droplets through the nozzle 72 into the spirally moving air stream, the injection of the droplets into the air stream is done in such a manner that movement of the air stream is not inhibited and thus a maximizing of flow of the air stream is achieved.

Preferredly the nozzle 72 is formed of a corrosion resistant stainless steel material, thus insuring a long service life. As noted above, galvanized sheet metal would be utilized in forming the chambers 54 and 56 and the vanes 68, 74, 76, 78, 80 and 82. Alternately these components could be formed of other materials such as fiberglass and the like.

As will be evident from the disclosure above, the device 10 is capable of being controlled either manually, wherein the motor 36 and the pump 84 are under manual control via appropriate switches and the like, or automated control, wherein a conventional timer, thermostat, humidistat or logic device is utilized to activate these components.

The device 10 is described as performing an evaporative cooling function. It is evident that alternately the device 10 could be utilized to mix a liquid into any large volume of gas for modification of the gas such as in humidifying the interior of a structure, introducing an insecticide or other agent or the like.

I claim:

1. A process for cooling a mass of air which comprises:
   locating a housing in conjunction with said mass of air, said housing of the type having an air inlet and an air outlet;
   extracting an air stream from said mass of air and moving said air stream through said air inlet of said housing into said housing and discharging said air stream out of said air outlet of said housing;
   increasing the residence time of said air stream in said housing by introducing a torsional motion into said air stream within said housing to cause said air stream to move in a spiral pathway within said housing;
   injecting a spray of water into said air stream as it moves in said spiral pathway within said housing, at least a portion of said water spray evaporating into said air stream while said air stream resides in said housing;
   said spray of water being ejected under a pressure and through a nozzle orifice of a size to create a droplet size less than 0.004 inches and greater than 0.002 inches, and directing said moist air stream downwardly from said air outlet in an expanding pattern and into contact with animals therebelow in order to cool said animals.

2. A process of lowering the ambient temperature of a structure which includes at least a roof which comprises:

locating a housing in said roof such that the top portion of said housing is exposed above said roof and the bottom portion of said housing is exposed below said roof;

locating a fan means in conjunction with said portion of said housing located above said roof;

locating a plurality of vanes within said housing, said vanes capable of modifying the direction of movement of an air stream contacting said vanes;

locating a nozzle within said housing, said nozzle capable of ejecting a spray of water into the interior of said housing;

operating said fan means to create an air stream moving through said housing and being discharged from said housing from the bottom portion of said housing exposed below said roof, operating said nozzle to discharge said spray of water into said air stream as it moves through said housing;

contacting said plurality of vanes with said air stream at said air stream moves through said housing to cause said air stream to move in a spiral pathway through said housing so as to increase the residence time of said air stream in said housing and to cause said air stream to be discharged from said housing in a pattern which enlarges as said air stream moves away from said housing.

3. A process for evaporative cooling of a mass of air which comprises:

locating a housing in conjunction with said mass of air, said housing of the type having an air inlet and an air outlet;

extracting an air stream from said mass of air and moving said air stream through said air inlet of said housing into said housing and discharging said air stream out of said air outlet of said housing;

increasing the residence time of said air stream in said housing by introducing a torsional motion into said air stream within said housing to cause said air stream to move in a spiral pathway within said housing;

injecting a spray of water into said air stream as it moves in said spiral pathway within said housing, at least a portion of said water spray evaporating into said air stream while said air stream resides in said housing;

said spray of water being ejected under a pressure and through a nozzle orifice of a size to create a droplet size less than 0.004 inches and greater than 0.002 inches; wherein said torsional motion is introduced into said air stream by contacting said air stream against a plurality of tiers of vanes located within the interior of said housing, each of said tiers of vanes including a plurality of vanes, said tiers of vanes spaced apart from one another between said air inlet and said air outlet, each of said vanes in each of said tiers of vanes oriented at an angle to an axis passing through said air inlet and said air outlet with the orientation of each of said tiers of vanes being greater than the orientation angle of the tier of vanes immediately preceding it in moving from said air inlet to said air outlet.

4. A process of mixing a volume of a liquid into a large volume of gas which comprises:

locating a housing in conjunction with said volume of gas, said housing of the type having a gas inlet and a gas outlet;

extracting a gas stream from said volume of gas and moving said gas stream through said gas inlet, through said housing and discharging said gas stream out of said gas outlet;

introducing a torsional motion into said gas stream within said housing to cause said gas stream to move in a spiral pathway within said housing;

said torsional motion introduced into said air stream by contacting said air stream against a plurality of tiers of vanes located within the interior of said housing, each of said tiers of vanes including a plurality of vanes, said tiers of vanes spaced apart one from another between said air inlet and said air outlet, each of said vanes in each of said tiers of vanes oriented at an angle to an axis passing through said air inlet and said air outlet with the orientation angle of each of said tiers of vanes being greater than the orientation angle of the tier of vanes immediately preceding it in moving from said air inlet to said air outlet;

injecting a spray of said liquid into said gas stream as said gas stream moves in said spiral pathway within said housing.

5. The process of claim 4 wherein:

each of said tiers of vanes are oriented with respect to said axis at an angle of from about 5 degrees to 10 degrees greater than the tier of vanes located immediately preceding it.

6. The process of claim 5 wherein:

said angle is from about 5 degrees to about 7 degrees greater.

7. The process of claim 4 including:

ejecting said spray of said liquid under a pressure and through a nozzle orifice of a size to create a droplet size less than 0.004 inches.

8. The process of claim 7 wherein:

said droplet size is greater than 0.002 inches.

9. The process of claim 7 wherein:

each of said tiers of vanes are oriented with respect to said axis at an angle of from about 5 degrees to about 10 degrees greater than the tier of vanes located immediately preceding it.

10. The process of claim 9 wherein:

said angle is from about 5 degrees to about 7 degrees greater.

11. A device for evaporative cooling of a mass of air which comprises:

a member having at least one gas inlet, a gas outlet and a hollow interior extending between said gas inlet and said gas outlet, said member having a longitudinal axis extending from said gas inlet through said interior to said gas outlet;

a fan rotatably mounted on said member in association with said gas inlet, said fan including a plurality of vanes each of which is oriented at an angle to said longitudinal axis, said fan moving an air stream through said air inlet and through said interior of said member with a force sufficient to discharge said air stream out of said air outlet of said member;

a plurality of tiers of vanes located within the interior of said member, each of said tiers of vanes including a plurality of vanes located in an array within said tier, said tiers of vanes spaced apart one from another between said fan and said gas outlet of said member, each of said vanes in each of said tiers of vanes oriented at an angle to said longitudinal axis with the angle of said vanes of the tier of vanes closest to said fan being greater than the angle of said fan vanes and in moving from said fan towards said gas outlet the angle of the vanes of each of the further tiers of vanes greater than the angle of the vanes of the tier of vanes immediately preceding it;

said fan vanes and said tiers of said vanes introducing a torsional component into said air stream as said air stream moves between said air inlet and said air outlet with said torsional component moving said air stream in a spiral pathway through said interior of said member;

an introduction means associated with said member and capable of introducing a quantity of water into said air stream as it moves in said spiral pathway through the interior of said member such that at least a portion of said quantity of water will evaporate within said air stream reducing the temperature of said air stream.

12. The device of claim 11 wherein:

each of said tiers of vanes are oriented with respect to said longitudinal axis at an angle of from about 5 degrees to 10 degrees greater than the tiers of vanes located immediately preceding it.

13. The device of claim 12 wherein:

said angle is from about 5 degrees to about 7 degrees greater.

14. The device of claim 11 wherein:

said introduction means includes a nozzle means located in the interior of said member and capable of introducing said quantity of water as a spray into said air stream as it moves in said spiral pathway in the interior of said member.

15. The device of claim 14 wherein: said member includes a first chamber which is cylindrical at least along a portion of its length, at least a portion of said plurality of vanes located on the inside surface of said first chamber, said first chamber having a first end and a second end, said second end comprising said gas outlet, said first end oriented toward said fan.

16. The device of claim 15 wherein:

said vanes located in said first chamber are located in a symmetrical array in said chamber and are shaped to project from the inside wall of said first chamber toward the longitudinal axis of said first chamber;

said nozzle means being positioned with respect to said first chamber such that said spray does not strike said vanes located within said first chamber when said air stream is moving through said first chamber.

17. The device of claim 16 wherein:

said member includes a second chamber, said second chamber being cylindrical in shape having open first and second ends and having an outside dimension less that the inside dimension of said first chamber;

at least a portion of said second chamber extending into said first chamber.

18. The device of claim 14 wherein:

said introduction means further includes means for ejecting said spray of water under a pressure and through a nozzle orifice of a size to create a droplet size less than 0.004 inches.

19. The device of claim 18 wherein:

said droplet size is greater than 0.002 inches.

20. The device of claim 19 wherein:

each of said tiers of vanes are oriented with respect to said longitudinal axis at an angle of from about 5 degrees to about 10 degrees greater than the tier of vanes located immediately preceding it.

21. A device for evaporative cooling of a mass of air which comprises:

a member having at least one gas inlet, a gas outlet and a hollow interior extending between said gas inlet and said gas outlet;

a first means associated with said member, said first means capable of moving air in an air stream from said gas inlet through said interior of said member and discharging said air stream out of said gas outlet, said first means moving said air stream through the interior of said member in a spiral pathway;

a second means associated with said member and capable of introducing a quantity of water into said air stream as it moves in said spiral pathway through the interior of said member such that at least a portion of said quantity of water will evaporate within said air stream reducing the temperature of said air stream;

said second means includes a nozzle means located in the interior of said member and capable of introducing said quantity of water as a spray into said air stream as it moves in said spiral pathway in the interior of said member;

said first means includes an air moving means associated with said air inlet of said member, said air moving means moving said air stream through said air inlet and through the interior of said member with a force sufficient to discharge said air stream out of said air outlet of said member;

said first means further includes a plurality of air stream direction modifying means, said modifying means capable of introducing a torsional component into the movement of said air stream as said air stream moves between said air inlet and said air outlet, said torsional component contributing to the movement of said air in said spiral pathway through he interior of said member;

said air stream directional modifying means comprises a plurality of vanes located in an array within the interior of said member;

said air moving means comprises a fan rotatably mounted on said member and a means associated with said fan to rotate said fan;

said member includes a first chamber which is cylindrical at least along a portion of its length, at least a portion of said plurality of vanes located on the inside surface of said first chamber, said nozzle means located within the interior of said first chamber, said first chamber having a first end and a second end, said second end comprising said gas outlet, said first end oriented toward said fan;

said vanes located in said first chamber are located in a symmetrical array in said chamber and are shaped to project from the inside wall of said first chamber toward the longitudinal axis of said first chamber;

said nozzle means being positioned within the interior of said first chamber such that said spray does not strike said vanes located within said first chamber when said air stream in moving through said first chamber;

said member includes a venturi component having an opening located therein, said opening comprising a venturi tube;

said fan rotatably mounted in association with said opening in said venturi component such that air contacted by said fan moves in an air stream through said venturi component;

said venturi component located in association with said first end of said chamber, said venturi component sized such that its outside dimension is less than the inside dimension of said first chamber, at least a portion of said venturi component located in association with the first end of said chamber forming at least a first open annulus between the outside portion of said venturi component and the inside of said first chamber, said first open annulus comprising a second gas inlet to said member such that said air stream exiting through said opening in said venturi component creates a reduced pressure area at said second inlet and air from the ambient environment is drawn into said reduced pressure area through said second inlet and into said air stream;

said member includes a second chamber, said second chamber being cylindrical in shape having open first and second ends and having an outside dimension less that the inside dimension of said first chamber;

at least a portion of said second chamber including said second end of said second chamber extending into said first end of said first chamber forming a second open annulus between the outside of said second chamber and the inside of said first chamber, said second annulus comprising a third gas inlet into the interior of sad member;

said opening in said venturi component located in association with said first end of said second chamber, said opening sized such that its diameter is less than the inside dimension of said second chamber such that said first annulus is located between said opening and the inside of said second chamber.

22. The device of claim 21 including:
at least a portion of said plurality of said vanes located in said second chamber.

23. The device of claim 22 wherein:
said member is vertically oriented such that the longitudinal axis of said first chamber, said second chamber and said venturi component are vertically oriented and pass through the center of rotation of said fan;

said vanes located in said second chamber being located in a position elevated with respect to all of said vanes located in said first chamber;

said vanes located in said first chamber being located in tiers one above the other along the inside surface of said first chamber.

24. The device of claim 23 wherein:
said fan includes a plurality of fan vanes each of which is oriented at an angle with respect to said longitudinal axis passing through the center of rotation of said fan;

said vanes located in said second chamber being oriented with respect to said longitudinal axis at a greater angle than the angle of said fan vanes;

said uppermost tiers of vanes located in said first chamber being oriented with respect to said longitudinal axis at a greater angle than the angle of said vanes located in said second chamber, each of the remaining plurality of tiers of said vanes in said first chamber being oriented with respect to said longitudinal axis at a greater angle than the tier of vanes located immediately above it.

25. The device of claim 23 wherein:
each of said tiers of vanes are oriented with respect to said longitudinal axis at an angle of from about 5° to 10° greater than the tier of vanes located immediately above it.

26. The device of claim 25 wherein:
said angle is from about 5° to about 7° greater.

* * * * *